(12) United States Patent
Zhang

(10) Patent No.: US 10,821,812 B2
(45) Date of Patent: Nov. 3, 2020

(54) LINE REGISTER

(71) Applicant: FORD GLOBAL TECHNOLOGIES, LLC, Dearborn, MI (US)

(72) Inventor: Yahong Zhang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 209 days.

(21) Appl. No.: 15/921,994

(22) Filed: Mar. 15, 2018

(65) Prior Publication Data

US 2018/0201099 A1   Jul. 19, 2018

Related U.S. Application Data

(63) Continuation of application No. 14/464,000, filed on Aug. 20, 2014, now Pat. No. 9,950,592.

(51) Int. Cl.
*B60H 1/34* (2006.01)
*B60H 1/00* (2006.01)

(52) U.S. Cl.
CPC ....... *B60H 1/3414* (2013.01); *B60H 1/00685* (2013.01); *B60H 2001/3478* (2013.01)

(58) Field of Classification Search
CPC ................ B60H 1/3414; B60H 2001/3478
USPC .................. 454/154, 107, 143, 149
See application file for complete search history.

(56) References Cited

U.S. PATENT DOCUMENTS

| | | | | |
|---|---|---|---|---|
| 2,182,716 | A * | 12/1939 | Brent | B60H 1/26 454/145 |
| 3,264,971 | A * | 8/1966 | Dangauthier | B60H 1/3435 454/154 |
| 3,680,470 | A * | 8/1972 | Neece | F24F 13/15 454/313 |
| 3,683,787 | A * | 8/1972 | Cary | B60H 1/3435 454/317 |
| 3,686,797 | A | 8/1972 | Taylor | |
| 3,861,281 | A | 1/1975 | Godwin | |
| 4,887,520 | A | 12/1989 | Bauer | |
| 4,936,159 | A * | 6/1990 | Kallio | B60H 1/0065 74/501.5 R |
| 5,188,561 | A * | 2/1993 | Nissimoff | F24F 11/00 454/256 |
| 5,588,910 | A | 12/1996 | Hutter et al. | |
| 5,733,189 | A | 3/1998 | Eastwood | |
| 5,967,891 | A | 10/1999 | Riley et al. | |
| 6,015,342 | A * | 1/2000 | Dennis | F24F 1/0011 454/316 |
| 6,146,265 | A | 11/2000 | Greenwald | |
| 6,394,891 | B1 | 5/2002 | Arold | |
| 6,554,696 | B2 | 4/2003 | Kowalski et al. | |
| 6,582,293 | B1 * | 6/2003 | Siniarski | B60H 1/3414 454/155 |

(Continued)

FOREIGN PATENT DOCUMENTS

| | | |
|---|---|---|
| DE | 19615223 A1 | 10/1996 |
| DE | 19748998 C1 | 10/1998 |

(Continued)

*Primary Examiner* — Edelmira Bosques
*Assistant Examiner* — Frances F. Hamilton
(74) *Attorney, Agent, or Firm* — David Coppiellie; MacMillan, Sobanski & Todd, LLC

(57) ABSTRACT

An automobile air vent register is described. The register uses a rotating vent cover, and an elongate opening in a configuration providing good air flow control within a limited space.

17 Claims, 5 Drawing Sheets

(56) References Cited

U.S. PATENT DOCUMENTS

| | | | |
|---|---|---|---|
| 6,739,969 B2 | 5/2004 | Shin | |
| 6,974,377 B2 * | 12/2005 | Gehring | B60H 1/3414 454/152 |
| 7,029,390 B2 | 4/2006 | Karadia | |
| 7,604,533 B2 | 10/2009 | Ogura et al. | |
| 8,166,775 B2 | 5/2012 | Choi | |
| 9,046,277 B2 | 6/2015 | Gruedl | |
| 2006/0073780 A1 | 4/2006 | Motszko et al. | |
| 2006/0172677 A1 | 8/2006 | Ryu | |
| 2009/0149123 A1 | 6/2009 | Blagg | |
| 2010/0124876 A1 | 5/2010 | Yu et al. | |
| 2013/0149953 A1 | 6/2013 | Seto | |
| 2014/0000397 A1 * | 1/2014 | Nolta, Jr. | F16H 35/02 74/393 |
| 2015/0099452 A1 | 4/2015 | Mazzocco et al. | |

FOREIGN PATENT DOCUMENTS

| | | | | |
|---|---|---|---|---|
| DE | 102004013171 B3 | 6/2005 | | |
| EP | 0434910 A2 | 9/1990 | | |
| EP | 0865946 A2 * | 9/1998 | | B60H 1/3435 |
| EP | 0879718 A2 * | 11/1998 | | B60H 1/3414 |
| EP | 0879718 A2 | 11/1998 | | |
| FR | 2845948 A1 | 4/2004 | | |
| GB | 2351145 A | 12/2000 | | |
| WO | WO2012053824 A3 | 7/2012 | | |

* cited by examiner

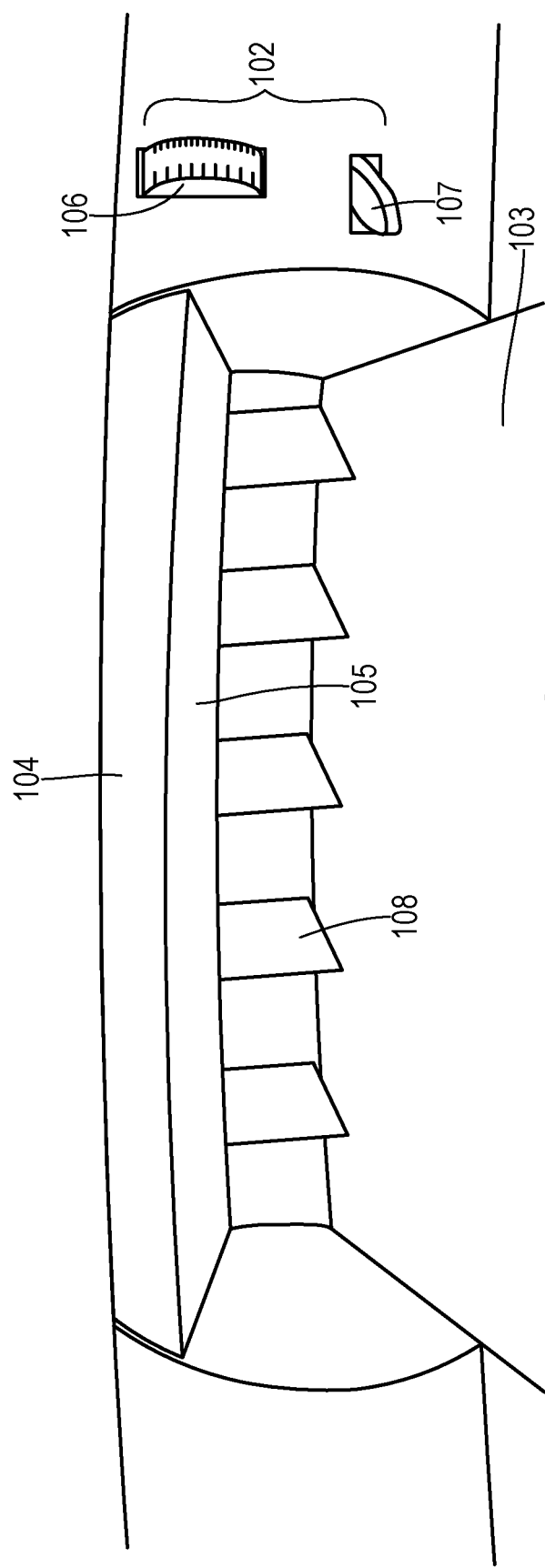

LINE REGISTER

CROSS REFERENCE TO RELATED APPLICATIONS

This application is a continuation of co-pending U.S. application Ser. No. 14/464,000, filed Aug. 20, 2014, the entire contents of which are hereby incorporated by reference for all purposes.

STATEMENT REGARDING FEDERALLY SPONSORED RESEARCH

Not Applicable.

BACKGROUND OF THE INVENTION

The present invention relates in general to air outlets, and more specifically to registers in automobile air conditioning systems.

Providing controlled airflow to people in automobiles is important in providing a comfortable driving experience. Directing the flow of air is a key factor in maintaining comfort.

Increasingly, modern vehicles have sophisticated displays, interactive navigational systems, entertainment systems, airbags, and other features competing for limited space in the vehicle, and in particular, on and around the instrument panel. Air vents are among the features generally provided on or around the instrument panel or dashboard. If air vents are too small or poorly configured, the air system may not provide flow where needed and may also cause unwanted noise, such as a whistling or hissing sound.

Accordingly, there is a need for air vents that provide good air flow and control using configurations that improve the use of limited space.

SUMMARY OF THE INVENTION

In one aspect of the invention, an apparatus is provided for a vehicle air register, comprising: an airflow path through an opening from a duct to a vehicle interior, the opening having a length and width, wherein the length is greater than the width; a cover, wherein the cover is semi-cylindrical and configured to rotate 120 degrees between a closed position and an open position; the cover having a partition separating a compartment from the airflow path.

In some embodiments, the opening length is at least three times the width.

In some embodiments, the opening length is at least four times the width.

In some embodiments, the opening length is at least five times the width.

In some embodiments, the register has a plurality of vanes oriented substantially perpendicular to the length of the register.

In some embodiments, the register has a plurality of vanes oriented substantially perpendicular to the length of the register, wherein the vanes are adapted to pivot, thereby directing air flow; a vane control, wherein the vane control is configured to pivot the vanes by a linear actuator; and a cover control, wherein the cover control is configured to rotate the cover to a closed, open, or partly-open position.

In some embodiments, the linear actuator is a rack and pinion system and the rack is substantially enclosed within the compartment.

In some embodiments, the cover is a single piece of material.

In some embodiments, the opening width is less than half of a width of the duct.

In some embodiments, the register further comprises at least two splitter fins placed along the airflow path between the duct and the opening.

BRIEF DESCRIPTION OF THE DRAWINGS

FIG. 2 is a front perspective image of a partly open register.

DETAILED DESCRIPTION OF PREFERRED EMBODIMENTS

Figure 1:
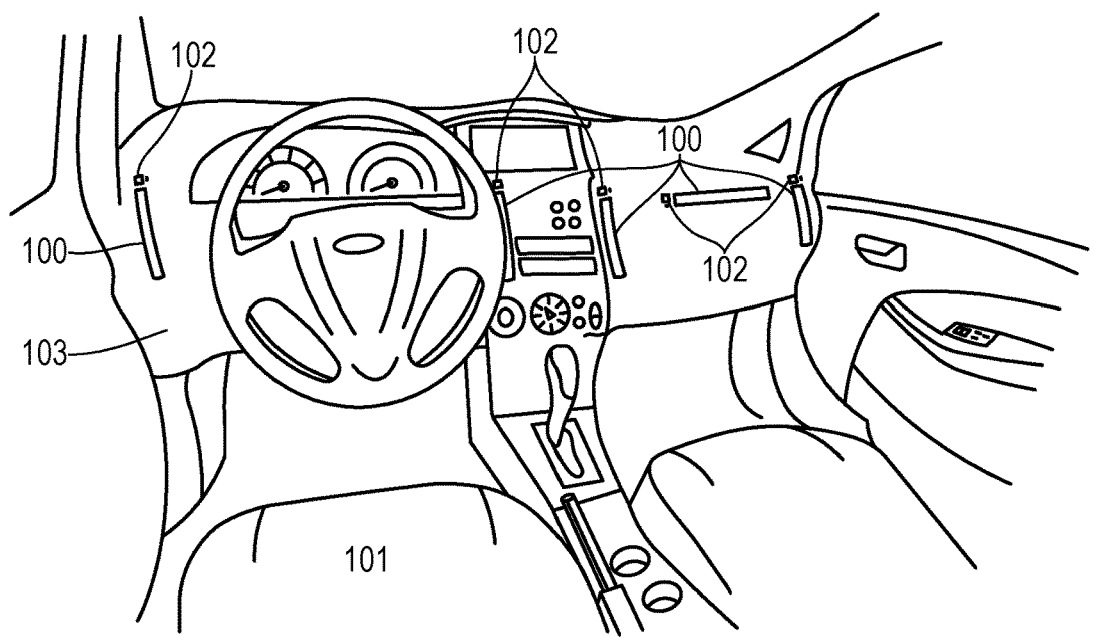
FIG. 1 is an image of a car interior showing example placements of air registers on the dashboard.

An automobile air vent register is described. The register provides good air flow control using configurations that improve the use of limited space. In particular, the register has a positionable cover that deflects and directs the flow of air.

The register dimensions are elongate. In some embodiments, the register opening is rectangular, with the length measured parallel to a pivot axis and the width measured perpendicular to the pivot axis. In some embodiments, the length of the longer dimension of the opening is more than four times the width of the opening. In some embodiments, the length is approximately six times the width. In some embodiments the length is five to fifteen times the width. The effective flow area must be sufficiently sized to accommodate the flow volume, though the ratio of length to width can vary. The terms length and width are used relative to the opening without limitation to the placement or orientation of the register in the automobile interior.

The register has a single set of vanes roughly perpendicular to the longer dimension of the register. The set of vanes may be movably mounted within a housing to direct air flow. The vanes turn or rotate to change air flow direction. A rack and pinion system may be utilized to control the rotational angle of the vanes.

The configuration of the open panel surface adjacent to the register can be shaped to utilize the coanda effect. The coanda (or Coandă) effect is the attraction of a fluid jet to flow along a nearby surface and follow its contour. This effect can be best utilized by orienting a surface alongside or at an angle to the air flow path. This surface may be referred to as an open surface panel. For example, a register placed on the instrument panel or dashboard can provide one or more air-directing surfaces as air flowing out of the register flows along a surface of the dashboard. As another example, a register can be positioned under and along an extruded long edge. The curved surface beneath that long edge can be used as its open surface panel.

The register has a single cover mounted to the housing. The cover rotates, or pivots, to cover the opening and the set of vanes, thereby blocking air flow. The cover can be open, closed, or partially open. In a partially open position, the cover may be adjusted to a desired angle to direct air flow. The interior surface of the cover, facing the airflow stream, is further configured to utilize the coanda effect to direct the air flow when it is in a partially open position.

The cover retracts into a compartment. The compartment is separated from the air flow path by a wall and by the cover partition so as to control turbulent flow. The partition surface shape may be flat or curved. The shape of the partition influences the air flow. When the register is fully open the cover is rotated into the compartment which encloses and conceals the semi-cylindrical surface of the cover from view.

In one embodiment, the cover describes about 120 degrees of an arc of a circle. In cross-section view along the pivot axis of cover, the register can be abstracted into three equally divided sections of a circle. Each section describes a 120 degree arc sector. When the register is fully closed, a first 120 degree arc sector is covered by the semi-cylindrical surface of the cover, facing the interior of the vehicle. When fully open, the first 120 degree arc sector is the opening of the register into the car interior. The second 120 degree arc sector provides an airflow path from the duct; it may also include a portion of the panel. The third 120 degree arc sector is used for cover retraction when the register fully open. The semi-cylindrical cover rotates into the housing compartment. The third sector further provides space for a control system for the vanes, for example, a rack-pinion control system. The exterior contour of the cover compartment sector may be visible from the car interior or may be hidden from view behind paneling.

In some embodiments the cover is positioned using a dial or wheel. In other embodiments the cover is positioned with tabs, ridges, indentations, or other surface detail on the cover surface or leading edge. In further embodiments, the cover is positioned by a motorized controller.

Air ducts supply air from a blower to the register. The register directs air flow into the passenger compartment. In some embodiments, airflow is further modulated by a splitter. A splitter can be placed in to the duct to provide improved air distribution. The use of splitters is particularly useful when directing air flow through a register with dimensions that differ substantially from the duct dimensions, as with an elongate register. This difference might include, for example, a duct with a cross-section width and height of approximately 5-7 centimeters providing air to a register with a width of approximately 12-16 cm and a height of approximately 2-3 cm. While in both instances the effective area is roughly the same, the dimensions differ substantially. In addition to the use of splitters, changes in side-wall dimensions along the air flow path can be used to restrict and spread the flow of air through the duct.

Turning now to the figures, by way of example, FIG. 1 depicts a car interior 101 showing line registers 100 on panels 103 of the dashboard. As shown, the orientation of the register 100 can vary. Although shown vertically and horizontally, the register 100 can also be oriented diagonally and in panels 103 that protrude or are recessed. Placement may be selected based on design parameters and desired air flow. Controls 102 for each register 100 may be located adjacent the vent opening.

Figure 3:
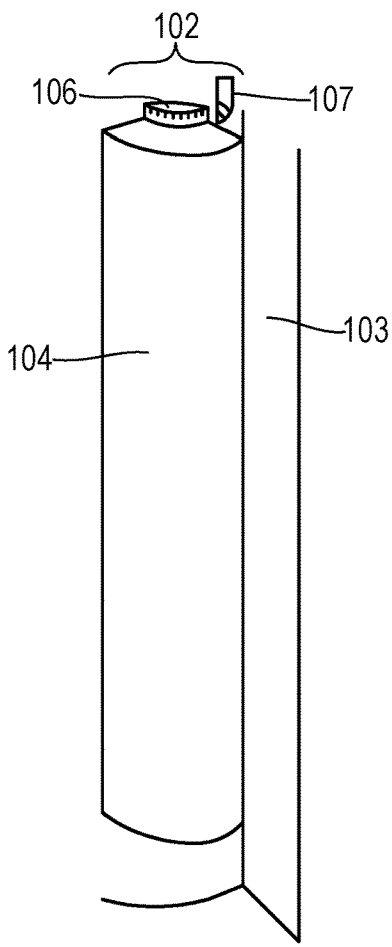
FIG. 3 is a front perspective image of a fully closed register.
Figure 4:
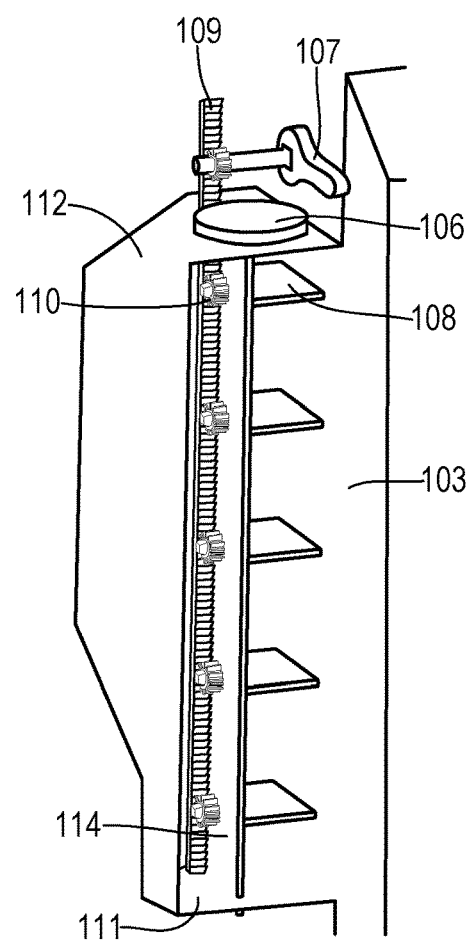
FIG. 4 is a front perspective cut away image of a register showing the interior cover housing and duct.

FIGS. 2-4 show a line register 100. The closed register 100 has a semi-cylindrical shape, convex towards the car interior 101, formed by a curved cover 104. Airflow is directed by vanes 108 which can be angled by a control 102. In the embodiment shown in FIGS. 2-4 control 102 is provided by a lever 107, which uses a rack 109 and pinion 110 system to angle the vanes 108, and by a knob, dial, or wheel 106 which controls the cover 104 position. The cover 104 can be partly open, as shown in FIG. 2, fully closed, as shown in FIG. 3, or fully open. When fully closed, the cover 104 blocks airflow through the register 100. FIG. 4 provides a cut-away view showing a wall 114 separating the airflow area from a compartment 111 that houses the cover 104 when the vent is open. This compartment 111 can also house a linear actuator for controlling the angle of the vanes 108 as shown with the rack 109 and pinion 110 system.

Figure 5:
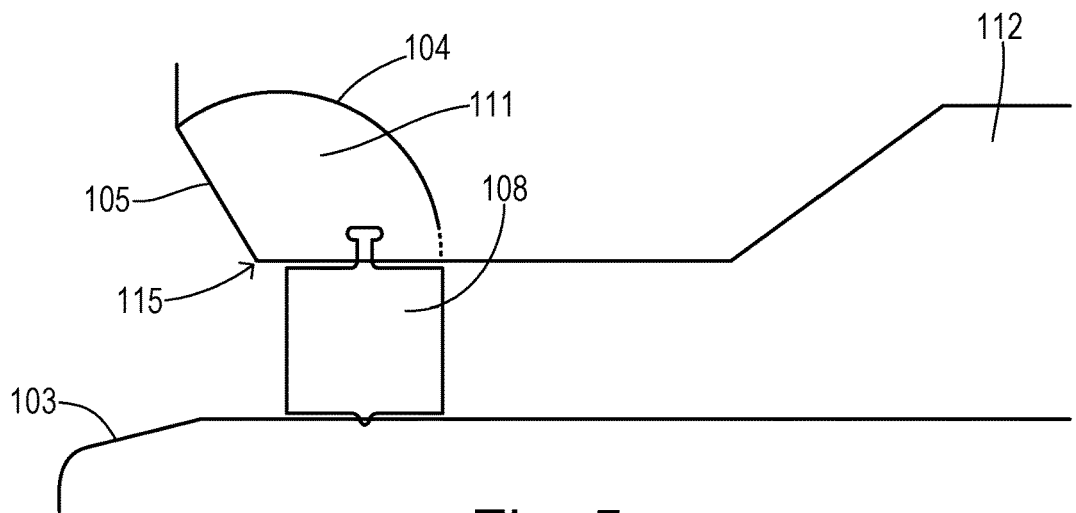
FIG. 5 is a cross-section image of a fully open register showing the interior cover housing, vanes, and duct.
Figure 6:
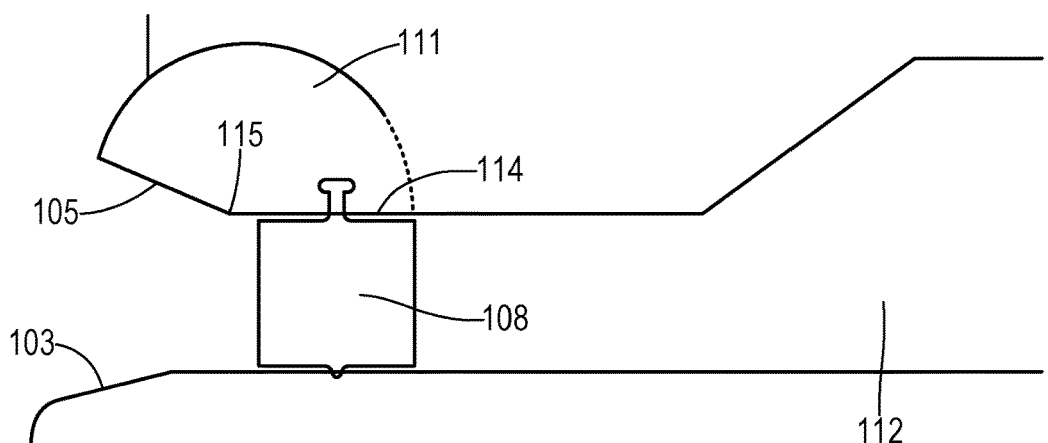
FIG. 6 is a cross-section image of a partly open register showing the interior cover housing, vanes, and duct.
Figure 7:
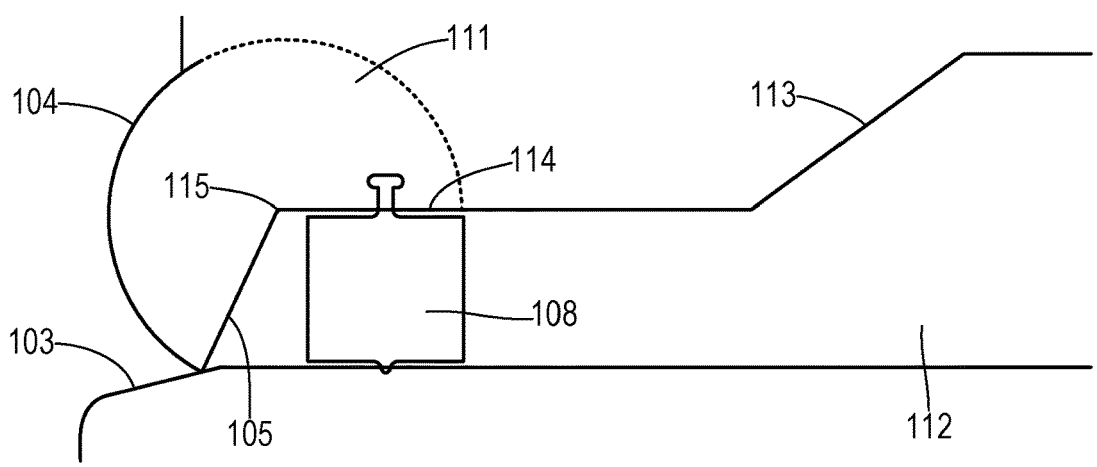
FIG. 7 is a cross-section image of a closed register showing the interior cover housing, vanes, and duct.

In the embodiment shown in FIGS. 5-7, the air flows from the duct 112 and past a restrictor 113 where the width of the duct 112 is reduced and the length broadens to maintain a roughly equivalent flow-path cross-section area. The air then flows past the vanes 108. As it enters the vehicle interior, the air flow is bounded and directed by the open surface panel 103 on one side and the cover partition 105 on the other side. The long narrow opening provides high efficiency air flow.

The cover 104 pivots around a pivot point 115. The pivot point 115 also defines the forward-most edge, nearest the vehicle interior 101, of a wall 114 that separates the air flow path from a compartment 111. The compartment 111 houses the cover 104 and may also house a linear actuator such as the rack 109 and pinion 110 pictured in FIG. 4. The compartment 111 may be defined on one side by a third of a circle, a 120 degree arc, described by the rotational path of the cover 104. This arc ensures that the cover housing area is sufficiently large to accommodate the cover 104. The compartment 111 is also defined by the cover partition 105 which connects one end of the arc of the semi-cylindrical cover 104 to the pivot point 115. The partition 105 faces and blocks the air flow path when the cover 104 is closed. When the cover 104 is open, or partly open, the cover partition 105 provides a surface for directing air flow.

Figure 8:
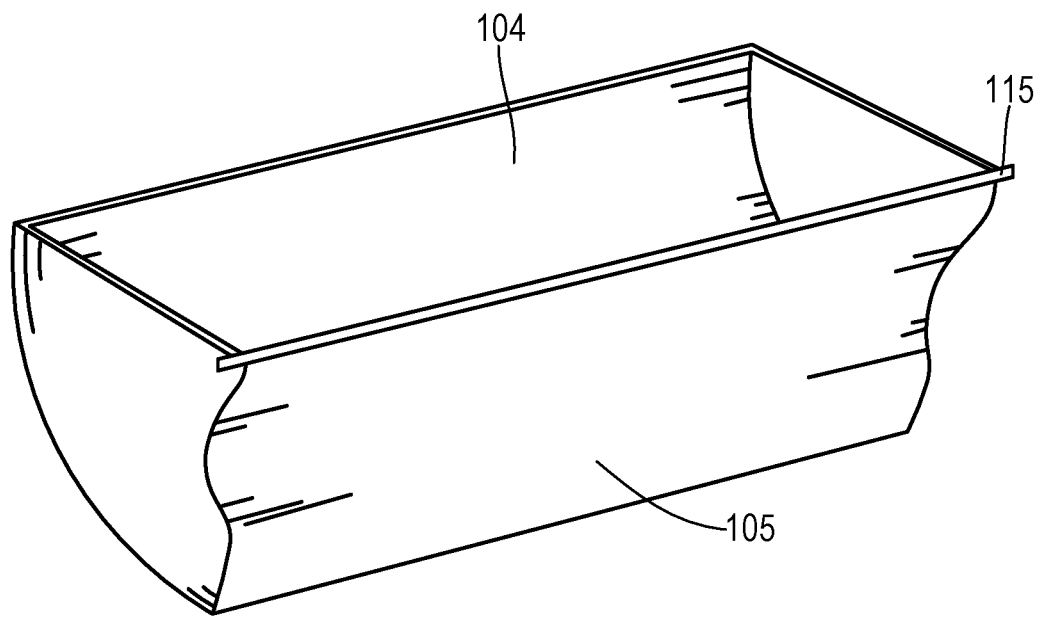
FIG. 8 is an image of an alternate embodiment of the cover with a curved partition.

The partition 105 may be flat, as shown in FIG. 5. It may also be curved. One example of a curved partition 105 is shown in the embodiment seen in FIG. 8. At opposite ends of the partition 105, wedge-shaped pieces connect the edge of the arc surface to the partition, with the tip of the wedge at the pivot point 115. FIG. 8 shows the cover 104 with a curved partition 105 surface.

The vane shape and placement may be adjusted to accommodate partition 105 curvature or duct 112 shape. If the partition 105 has substantial curvature, the vanes 108 may be placed closer to the duct 112. The actuation mechanism for the vanes 108 may be off center from the centerline of the vanes 108. Additionally, a linear actuator, or other control mechanism can be placed behind a panel 103, rather than in the compartment 111, to accommodate partition 105 curvature.

Air flows from a blower (not pictured), through ducts 112, past the vanes 108, and into the vehicle interior. Placement and shaping of one or more panels 103 adjacent the air flow path into the vehicle interior 101 provides direction of the air flow by the coanda effect. Similarly, the shape of the partition 105 provides an additional surface for directing airflow and utilizing the coanda effect.

Figure 9:
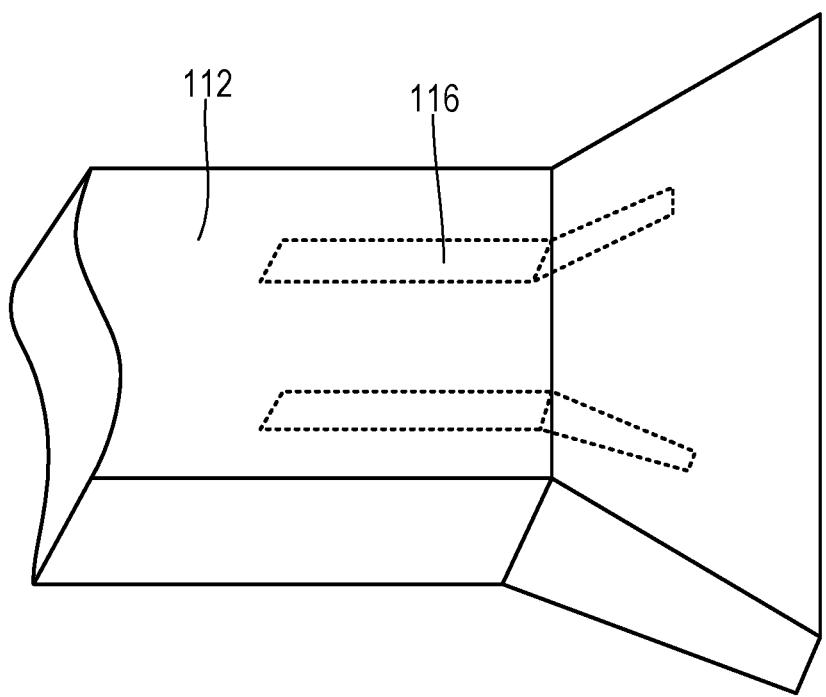
FIG. 9 is an image of a duct with splitters.

FIG. 9 shows a segment of the duct 112 adjacent the register 100. The duct 112 has a set of fins 116 functioning as a diffuser or splitter to direct airflow to more evenly flow through the register 100.

Figure 10:
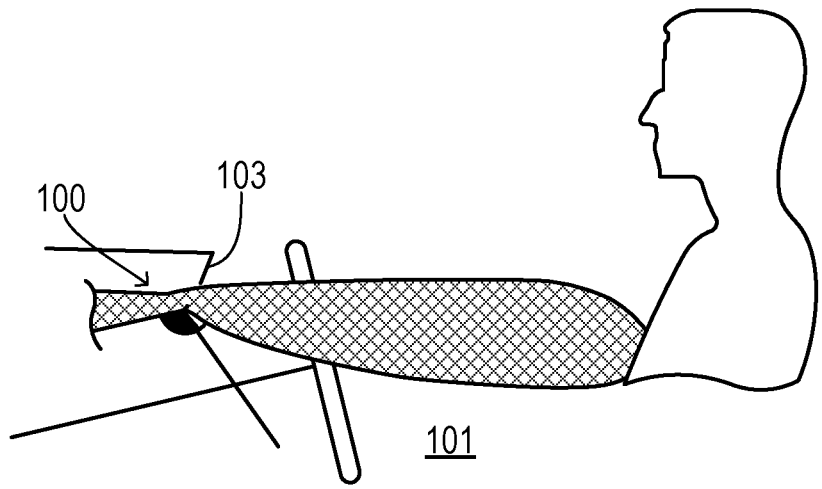
FIG. 10 is an image of air flow through an open register.
Figure 11:
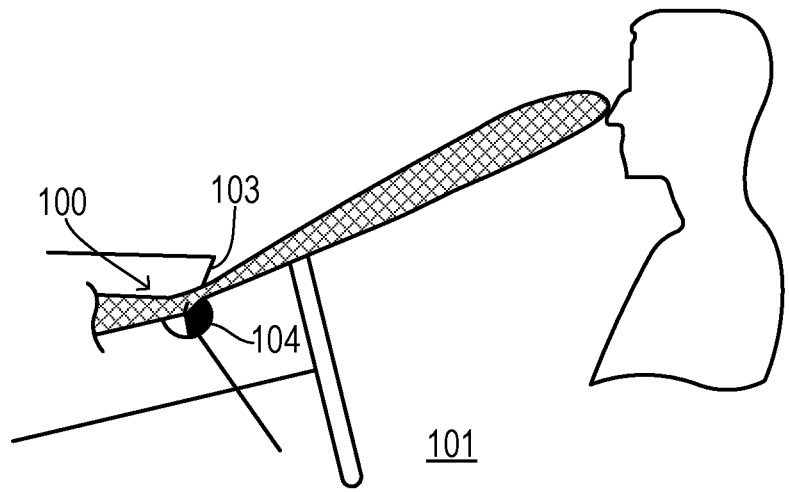
FIG. 11 is an image of air flow through a partly open register.

FIG. 10 and FIG. 11 show a simplified representation of air flowing into the vehicle interior 101 through the register 100, oriented with the long axis horizontal and the cover compartment 111 on the bottom. In FIG. 10 the register cover 104 is fully open and the air flow expands to a broad area upon entering the vehicle interior. In FIG. 11 the register cover is partly open and the air flow is directed in a narrow stream, in this instance, toward the face of the driver.

In particular installations and embodiments, the register may be formed of aluminum, plastic, metal alloys, composites, or other stiff materials. The structure may be adapted by means known in the art, such as with the use of gaskets, brackets, diffusers, and the like. The surfaces may be adapted with flow indicators, climate control demonstration, pictographs, logos, texturing, and additional features.

The terms and expressions which have been employed are used as terms of description and not of limitation. Whenever a range is given in the specification, all intermediate ranges and subranges, as well as all individual values included in the ranges given are intended to be included in the disclosure. It should be understood that, although the present invention has been specifically disclosed by particular embodiments and examples, optional features, modification and variation of the concepts herein disclosed may be used by those skilled in the art, and such modifications and variations are considered to be within the scope of the invention as defined by the appended claims.

What is claimed is:

1. A vehicle air register, comprising:
    an opening for an airflow path to a vehicle interior from a duct, the opening having length and width, wherein the length is three to fifteen times the width; and
    a cover configured to rotate between open and closed around a pivot axis parallel to the length, and comprising:
        a semi-cylindrical surface, whereby the closed cover is semi-cylindrical on a surface facing the vehicle interior; and
        a partition extending from the pivot axis to a leading edge of the semi-cylindrical surface, whereby the partition separates a compartment from the airflow path.

2. The register of claim 1, wherein the cover is configured to rotate 120 degrees between closed and open.

3. The register of claim 1, wherein the opening has a length five to fifteen times the width.

4. The register of claim 1, further comprising a pair of wedge-shaped pieces, at opposite lengthwise ends of the semi-cylindrical surface, connecting the semi-cylindrical surface to the partition; and wherein a tip of each of the wedge-shaped pieces is at a point on the pivot axis.

5. The register of claim 1 further comprising: a plurality of vanes oriented substantially perpendicular to the length of the register.

6. The register of claim 1 further comprising:
    a plurality of vanes oriented substantially perpendicular to the length of the register, wherein the vanes are adapted to pivot, thereby directing air flow;
    a vane control, wherein the vane control is configured to pivot the vanes by a linear actuator, wherein the linear actuator is substantially enclosed within the compartment; and
    a cover control, wherein the cover control is configured to rotate the cover to a closed, open, or partly-open position.

7. The register of claim 1, wherein the cover is a single piece of material.

8. The register of claim 1, wherein the opening width is less than half of a width of the duct.

9. The register of claim 1, wherein the partition defines a partition surface configured to direct the airflow when the cover is in the open or a partly-open position, and wherein the partition surface faces and blocks the airflow path when the cover is closed.

10. The register of claim 1, wherein the partition defines a partition surface configured to direct the airflow when the cover is in the open or a partly-open position, and wherein the partition surface has an area in a range of about 24-48 square cm.

11. The register of claim 1, wherein the partition defines a partition surface configured to direct the airflow when the cover is in the open or a partly-open position, and wherein the partition surface is curved.

12. A vehicle air register, comprising:
    an opening from a duct to a vehicle interior, the opening having length and width, wherein the length is three to fifteen times the width; and
    a cover configured to rotate between closed and open around a pivot axis parallel to the length, wherein the pivot axis defines an edge of the opening, and wherein the closed cover covers the opening and has a semi-cylindrical surface facing the vehicle interior.

13. The register of claim 12, wherein the cover is configured to rotate 120 degrees between closed and open.

14. The register of claim 12, wherein the cover further comprises:
    a partition extending from the pivot axis to a leading edge of the semi-cylindrical surface, whereby the partition is configured to direct airflow when the cover is in the open or a partly-open position, and wherein the partition blocks airflow through the opening when the cover is closed.

15. The register of claim 12, wherein the opening has a length five to fifteen times the width.

16. A method of directing airflow into a vehicle interior, comprising:
    providing a vehicle air register comprising:
        an opening from a duct to the vehicle interior, the opening having length and width, wherein the length is three to fifteen times the width; and
        a cover configured to rotate between closed and open around a pivot axis parallel to the length, wherein the closed cover covers the opening and has a semi-cylindrical surface facing the vehicle interior, and wherein the cover has a partition extending from the pivot axis to a leading edge of the semi-cylindrical surface; and
    rotating the cover to a partly-open position, whereby the partition bounds and directs airflow through the opening.

17. The method of claim 16, further comprising: subsequently rotating the cover to a closed position, whereby the partition blocks airflow through the register.

* * * * *